Sept. 24, 1963   J. J. SLAVEN   3,104,649
WILD BIRD FEEDING STATION
Filed Jan. 16, 1962

INVENTOR
JOHN J. SLAVEN
BY
ATTORNEYS

United States Patent Office

3,104,649
Patented Sept. 24, 1963

3,104,649
WILD BIRD FEEDING STATION
John J. Slaven, 30 Locust Ave., Westmont, N.J.
Filed Jan. 16, 1962, Ser. No. 166,650
15 Claims. (Cl. 119—51)

This invention relates to bird feeders and is especially concerned with that type of bird feeding station which can be adjusted to provide feed for birds below a determined size but will shut out birds of larger size—squirrels, etc.

There have been many proposals offered over the years for the construction of bird feeding stations which will selectively supply feed only to birds of smaller weight. Most of these, although reasonably effective under fair weather conditions, encounter difficulties when the weather conditions include freezing rain, sleet, snow or high winds. Others fail to completely attain their objectives because of mechanical difficulties, excessive cost, or the employment of mechanism which is overly sensitive or complex.

A primary objective of the present invention is the provision of a feeding station which can be easily manufactured, is extremely sturdy and positive in its action, and capable of affording protection to the feed supply against weather damage. Other objectives include the provision of an extremely simple and fool-proof mechanism for controlling the excluding function; for facilitating replenishment of the feed supply; and for providing for quick and facile adjustment of the parts so as to ensure that the feeding station will serve the needs of the desired class of birds and will positively exclude unwanted guests.

How these and other objectives, which will be apparent to those skilled in the art, may be attained will become apparent from what follows. This description, for illustrative purposes, is applied to a preferred embodiment of the invention which is illustrated in the accompanying drawings.

Figure 1:
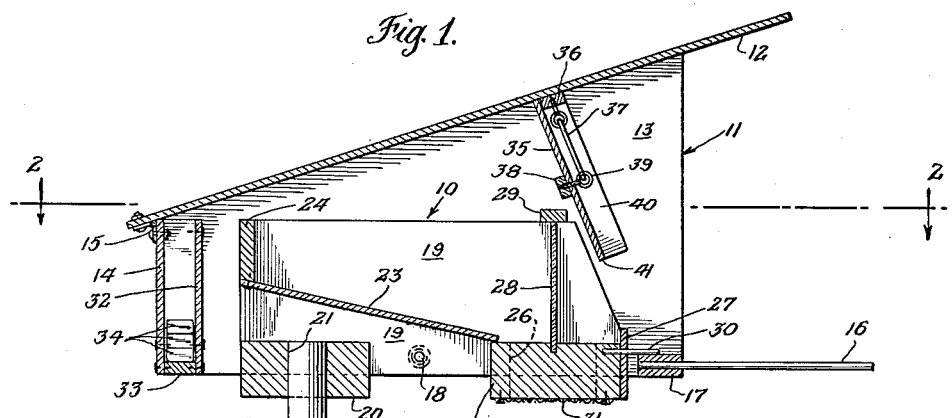
FIG. 1 is a vertical section through the center of the device, taken on the line 1—1 of FIG. 2.
Figure 2:
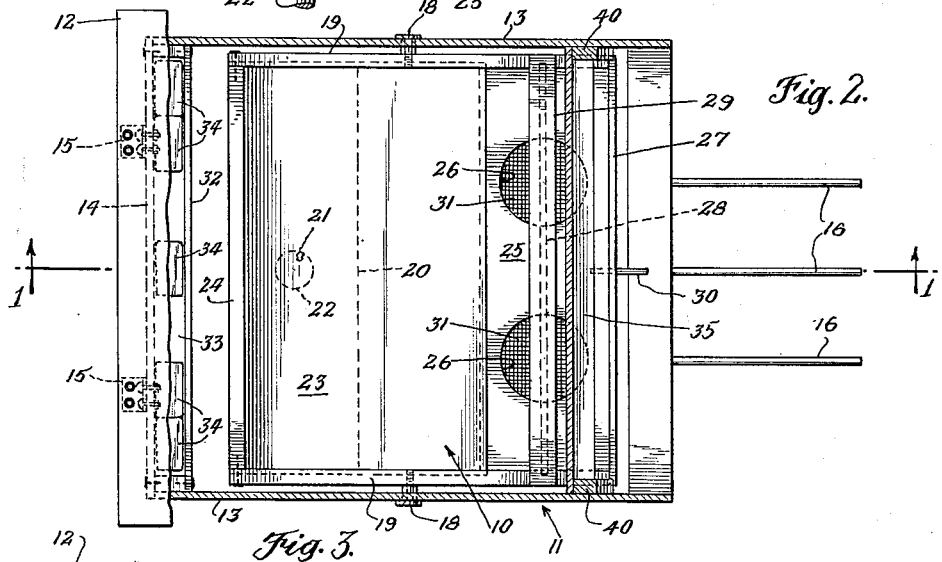
FIG. 2 is a plan view, taken on the line 2—2 of FIG. 1.
Figure 3:
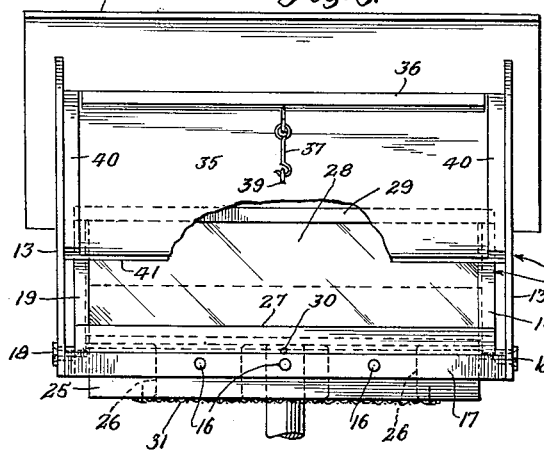
FIG. 3 is an elevational view taken from the front of the device and looking toward the rear. In these three figures the device is shown in the position in which it is operative to supply feed to birds of the desired size.

Referring now particularly to FIG. 1: The feeding station consists essentially of two major units. The first of these is the feed bin 10. The second is a lean-to shelter 11, which encloses the feed bin on three sides and has a lid or roof structure 12 extending beyond the open side of the lean-to shelter to act as a rain hood. The lid structure is supported on the side walls 13, 13 and on the rear wall 14; it is pivotally connected to the rear wall by spaced hinges 15, 15. The shelter is provided at its open end with perches 16, mounted in a horizontal, supporting bar 17, which extends from side to side of the housing.

The entire lean-to housing 11 is pivotally supported on the feed bin structure 10, by means of pivot studs 18, 18, which interconnect the side walls 13, 13 of the shelter with the side walls 19, 19 of the feed bin structure. The feed bin structure itself is carried on a sturdy transverse base bar 20, which extends from side to side of the feed bin and is centrally apertured as at 21 to receive the head of a mounting post 22, which is firmly fixed in the ground.

The part of the bin structure which receives the grain or other feed is defined by the sloping bottom plate 23, which slants downwardly from the rear towards the front, between the side walls 19, 19. These walls are preferably grooved to fit the bottom plate snugly. The rear wall 24 of the hopper so formed likewise extends between the side walls of the bin. Along the forward edge of the bottom plate 23, a transverse platform 25 is positioned, extending between the side walls of the feed bin. This is provided with feed wells 26, 26 to whatever number might be desired.

The front of the bin is configured to co-operate with occluding means carried on and below the lid. To this end, the front edges of the side walls 19, 19 are steeply sloped forwardly and downwardly from the top towards the bottom. (See FIGURE 1.) A retaining strip 27 is provided, attached to the front edge of the platform 25, and projecting slightly above it, to prevent loose kernels of grain or other feed from being spilled over the forward edge of the platform.

In order to increase the grain-carrying capacity of the bin, and to show the level of feed remaining in it, I provide a glass baffle plate 28, the upper edge of which nests in a groove formed in a transverse sill member 29 and the lower edge of which rests in a groove formed in the platform 25. In the forward end of the platform 25, and projecting through and beyond the retaining strip 27, a stop member 30 is provided, which engages the supporting bar 17, thereby insuring that the pivoted lean-to shelter will not tilt too far.

The hopper portion of feed bin 10 carries grain or other feed, and permits it to flow by gravity into the feed wells 26. A screen 31 is positioned to close the lower ends of these feed wells and prevent the feed from falling through. Obviously, any form of sheet material could be used, but I prefer to employ a screen because any moisture which may find its way into the grain supply may then pass freely through the bottom of the feed wells, and air will have access to the grain in the feed wells to assist in drying out any residual moisture which may remain.

The lean-to structure is maintained in the position shown in FIG. 1 by a counter-balancing mechanism provided at the rear end of the device; this consists simply of a transverse plate 32 parallel to the rear wall 14 and spaced inwardly therefrom by means of a spacing strip 33, positioned at its lower edge. This forms a compartment, open at the top, which extends from side wall to side wall of the housing. In it any suitable counterweighting material may be placed.

I prefer to use as counterweights small pieces of metal 34, although sand, gravel, or any other fairly heavy material may be employed instead. Granular material, such as sand, may freeze in the counterweight compartment, and be difficult to remove.

Enough of the counterweighting material is used to maintain the housing with its bottom level, so long as the weight of the bird on the perch 16 at the front end of the housing does not overbalance the counterweight. If a heavier bird alights upon the perch, or a squirrel or other unwelcome visitor, the housing will tilt downward at the front end, and this in itself may suffice to dislodge the intruder.

Whether it dislodges the intruder or not, access to the grain in the feed wells is effectively prevented by the block-out plate 35, which is mounted to the underside of the lid 12 at an angle corresponding to the slant of the forward edges of the side walls, 19, 19 of the feed bin. The block-out plate 35 is preferably attached to the lid 12 by a mounting strip 36, which not only spans the distance between the side walls 13, 13 of the housing but also affords a base into which the hook portion 37 of a hook-and-eye fastening may conveniently be screwed. Along the rear face of the block-out plate 35 a supporting strip 38 is provided, which stiffens the block-out plate and also provides a base into which the eye portion 39 of the hook-and-eye fastening may be screwed. Additional supporting strips, 40, 40 for the block-out plate 35 are mounted on the side walls 13,13 to further stiffen the plate, and secure it to the lid at the proper angle to engage the forward edges of the feed bin walls 19, 19 on tilting.

When an excessively heavy animal or bird lights on the perch 16, or on the roof 12 of the housing, the entire lean-to structure tilts down, as previously mentioned, until the lower edge 41 of the block-out plate 35 rests upon the upper edge of the retaining strip 27, thereby effectively preventing access to the food in the feed wells.

Figure 4:
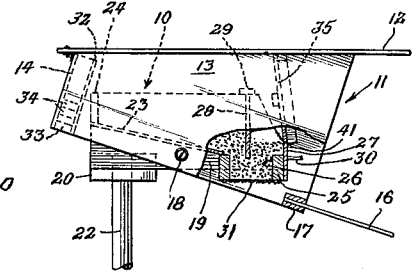
FIG. 4 is a small diagrammatic side elevation, partly broken away, to show the device in a position to exclude unwanted guests.

This is the position shown in FIG. 4, where a portion of the side wall 13 of the housing has been broken away to show a sectional view through the center of one of the feed wells, and to show how the block-out plate 35 registers with the retaining strip 27 to positively prevent any access to the grain.

When the supply of feed in the bin 10 needs to be replenished, the hook-and-eye fastening 37, 39 is released, and the lid is tilted upward on the hinges 15. This gives complete and easy access to the open top of the feed hopper, and also permits access to the compartment in which the counter-balancing material is located.

It will be seen that the device of the present invention is gravity-operated throughout. It is quite positive in its action, and capable of rather sensitive adjustment. It will also be seen that the entire structure is easily and quickly assembled so that it is inexpensive to produce, and yet manifests a rather high degree of immunity to weather. This weather resistance is enhanced by using a roof member of sufficient size to overhang the walls.

In any event, it seems to be capable of working effectively in stormy weather or in fair. If it should be necessary to increase the counterweighting, so as to compensate for icing conditions which might upset the balance of the tilting lean-to, it is very easy to raise the roof and add or subtract ballast in the counterweight compartment. It is, of course, apparent that there is no need to adjust the counterweighting to compensate for fluctuations in the amount of feed in the hopper, since that is carried in a fixed support and does not affect the balance of the lean-to shelter.

I claim:

1. In a wild-bird feeding station, the combination of a feed bin and a tiltable shelter having a roof and having upright wall structure which surrounds the feed bin except for a frontal access opening of substantial extent, pivot means interconnecting the shelter with the feed bin and affording a pivot axis extending in the same general direction as the access opening but spaced rearwardly therefrom, said feed bin being adapted to rest upon a fixed support and comprising an open-topped hopper configured to supply feed by gravity to a feeding zone adjacent the access opening in the shelter, said shelter further having bird-supporting means mounted thereon in a locus forward of the pivot axis adjacent the feeding zone and still further having counterweighting means to the rear of the pivot axis in a locus opposite the bird-supporting means.

2. The device of claim 1, wherein the shelter and the feed bin are rectangular in plan.

3. The device of claim 2, wherein the pivot means are mounted in the side walls of the shelter and a compartment to receive counterweighting material is provided adjacent the rear wall thereof.

4. The device of claim 2, wherein the pivot means are mounted in the side walls of the shelter and a compartment to receive counterweighting material is provided adjacent the rear wall, and the roof is hinged to the rear wall, overlying the said compartment.

5. The device of claim 1 in which the roof is pivotally mounted on wall structure above the counterweighting means, and an occluding plate depends from the roof, being mounted thereto in a position to prevent access to the feeding zone when the weight on the bird support means overbalances the counterweight, and the shelter tilts.

6. The device of claim 1, wherein the hopper is provided with a transparent wall adjacent the feeding zone, whereby to reveal the quantity of feed therein.

7. The device of claim 1, wherein a member of substantial thickness having at least one feed well formed therein provides the feeding zone.

8. The device of claim 7, wherein the hopper is provided with a frontal wall member which bridges the feed well.

9. The device of claim 7, wherein the feed well is open above and below, and an air-pervious feed retaining element is positioned across the lower opening.

10. A wild-bird feed station comprising a lean-to shelter pivotally mounted on a feed bin, said bin being configured to receive and rest upon the top of a fixed mounting post; an open-topped hopper in said bin, having a sloping bottom, a transparent frontal retaining wall, and side walls the forward edges of which slant steeply upwardly and rearwardly; a platform extending transversely of the bin, and having at least one feed well recessed into its upper face, said feed well being positioned to receive feed from the forward edge of the sloping bottom of the bin, behind the retaining wall and to deliver feed to a locus forward of said wall; said lean-to shelter having two side walls, a rear wall, and a sloping roof member which overhangs said walls, a transverse bird-supporting bar carried between the forward lower portions of the side walls, a counterweight-receiving compartment mounted within and adjacent the rear wall, and an occluding plate depending from the roof member between the side walls at an angle to rest upon the slanting forward edges of the side walls forming the hopper; pivot means interconnecting the side walls of the shelter with the feed bin structure, and affording a pivot axis between the counterweight compartment and the bird-supporting bar about which the entire lean-to shelter tilts when the weight on the bird-supporting bar overbalances that in the counterweight compartment.

11. A selective bird feeder comprising a support means, a feed material dispenser affixed to said support means, and an outer enclosure rotatably mounted to encase said feed material dispenser, said outer enclosure being rotatable about said feed material dispenser to dislodge large birds and marauding animals from said feeder.

12. A selective bird feeder comprising a support means, a feed material dispenser affixed to said support means, and an outer enclosure rotatably mounted to encase said feed material dispenser, said outer enclosure including an access opening to permit access to said feed material dispenser, said access opening being effectively closed by the rotation of said outer enclosure relative to said feed material dispenser.

13. A selective bird feeder comprising a support means, a feed material dispenser including feed containing means affixed to said support means, and an outer enclosure rotatably mounted to encase said feed material dispenser, said outer enclosure including an access opening normally aligned with said feed containing means, said access opening being moved from alignment with said feed containing means upon rotation of said outer enclosure relative to said feed material dispenser to deny access to large birds and marauding animals.

14. A selective bird feeder comprising a support means, a feed material dispenser affixed to said support means, said feed material dispenser including a central storage compartment and a plurality of feed cups extending outwardly from said central storage compartment in cooperation therewith, and an outer enclosure rotatably mounted to encase said feed material dispenser, said outer enclosure including an access opening aligned with said feed cups, said access opening being effectively closed upon rotation of said outer enclosure relative to said feed material dispenser.

15. A selective bird feeder comprising a support means, a feed material dispenser affixed to said support means, an outer enclosure rotatably mounted to encase said feed material dispenser, and weight means attached to said outer enclosure, said weight means acting to prohibit the rotation of said outer enclosure by small, lightweight birds, but acting to permit the weight of large birds and marauding animals to rotate said outer enclosure relative to said feed material dispenser, thereby dislodging said large birds and animals from said feeder.

No references cited.